United States Patent
Wang et al.

[11] Patent Number: 5,978,319
[45] Date of Patent: Nov. 2, 1999

[54] THIN ELECTRO-MAGNETIC COIL ASSEMBLY FOR ATTACHMENT TO A SLIDER

[75] Inventors: Yugang Wang, Milpitas; Tatsuaki Hishida, San Jose, both of Calif.

[73] Assignee: Read-Rite Corporation, Milpitas, Calif.

[21] Appl. No.: 08/965,340

[22] Filed: Nov. 6, 1997

[51] Int. Cl.⁶ ............................................. G11B 11/00
[52] U.S. Cl. .............................................. 369/13; 360/114
[58] Field of Search ........................... 369/13, 44.14, 369/44.23, 44.26, 44.39, 118, 110, 14, 112; 360/114, 59, 126, 123, 102, 103

[56] References Cited

U.S. PATENT DOCUMENTS

| | | | |
|---|---|---|---|
| 4,890,178 | 12/1989 | Ichibara | 360/114 |
| 5,022,018 | 6/1991 | Vogelgesang et al. | 369/13 |
| 5,071,509 | 12/1991 | Kano et al. | 156/643 |
| 5,072,324 | 12/1991 | Lin et al. | 360/126 |
| 5,105,408 | 4/1992 | Lee et al. | 369/44.15 |
| 5,111,440 | 5/1992 | Mathildus et al. | 369/13 |
| 5,124,961 | 6/1992 | Yamaguchi et al. | 369/13 |
| 5,197,050 | 3/1993 | Murakami et al. | 369/13 |
| 5,227,012 | 7/1993 | Brandii et al. | 156/644 |
| 5,293,360 | 3/1994 | Hasegawa et al. | 369/13 |
| 5,295,122 | 3/1994 | Murakami et al. | 369/13 |
| 5,307,328 | 4/1994 | Jacobs et al. | 369/13 |
| 5,331,496 | 7/1994 | Wu et al. | 360/126 |
| 5,370,766 | 12/1994 | Desaigoudar et al. | 156/643 |
| 5,402,293 | 3/1995 | Smith | 369/13 |
| 5,448,538 | 9/1995 | Aratani et al. | 369/13 |
| 5,544,131 | 8/1996 | Albertini et al. | 369/13 |
| 5,563,871 | 10/1996 | Bargerhuff et al. | 369/119 |
| 5,572,179 | 11/1996 | Ito et al. | 336/200 |
| 5,615,183 | 3/1997 | Ishii | 369/13 |
| 5,617,378 | 4/1997 | Watanabe et al. | 369/13 |
| 5,617,379 | 4/1997 | Shinozaki et al. | 369/13 |
| 5,642,336 | 6/1997 | Albertini et al. | 369/13 |
| 5,668,787 | 9/1997 | Shigematsu et al. | 369/13 |
| 5,689,478 | 11/1997 | Ishii et al. | 369/13 |
| 5,689,480 | 11/1997 | Kino | 369/13 |
| 5,703,839 | 12/1997 | Ishii | 369/13 |
| 5,703,840 | 12/1997 | Kazama | 369/13 |
| 5,903,525 | 5/1999 | McDaniel et al. | 369/13 |

FOREIGN PATENT DOCUMENTS

3-113-756  5/1991  Japan .

*Primary Examiner*—Ali Neyzari
*Attorney, Agent, or Firm*—Robert King; Samuel A. Kassatly

[57] ABSTRACT

A coil assembly for use in an optical or a magneto-optical data storage system includes an undercoat and an electrically conductive coil formed of a length of electrical conductor and deposited and secured to the undercoat by means of available wafer processing techniques. The conductive coil terminates in two bonding pads for providing electrical connection to the coil, such that the coil is capable of sustaining an electrical current in excess of approximately 300 mA. The coil is also capable of generating a vertical magnetic field intensity greater than, or equal to approximately 200 Oersteds, and has a resistance of less than, or equal to approximately 2 ohms. The coil assembly further includes a yoke, and an insulation layer which encapsulates at least part of the conductor. The conductor is formed of a plurality of multi-layered turns, such that a first layer is connected to one contact pad and is looped helically, inwardly, and terminates in an innermost turn with a terminal end. A second layer includes an innermost terminal end that overlays the innermost terminal end of the first layer, in order to establish an electrical contact therewith, and to ensure the continuity of the electrical path formed by the coil. The second layer is coiled into a plurality of concentric helical turns, similar to, and in a same coiling direction as the first layer. The conductor is made of a electrically conductive material and has a substantially uniform square cross-sectional area along its entire length.

34 Claims, 6 Drawing Sheets

THIN ELECTRO-MAGNETIC COIL ASSEMBLY FOR ATTACHMENT TO A SLIDER

BACKGROUND OF THE INVENTION

1. Field of the Invention

This invention relates generally to optical and magneto-optical data storage systems, and in particular to a thin film electro-magnetic coil assembly for use in optical and magneto-optical data storage systems. The coil assembly may be used in other applications, including but not limited to wireless telecommunications, sensors, transducers, transformers, and inductors.

2. Description of Related Art

A conventional magnetic storage system includes a magnetic head that has a slider element and a magnetic read/write element, and is coupled to a rotary actuator magnet and a voice coil assembly by a suspension and an actuator arm to be positioned over a surface of a spinning magnetic disk. In operation, lift forces are generated by aerodynamic interactions between the magnetic head and the spinning magnetic disk. The lift forces are opposed by equal and opposite spring forces applied by the suspension such that a predetermined flying height is maintained over a full radial stroke of the rotary actuator assembly above the surface of the spinning magnetic disk.

Flying head designs have been proposed for use with optical and magneto-optical (MO) storage technology. One motivation for using the magneto-optical technology stems from the availability of a higher areal density with magneto-optical storage disks than magnetic storage disks. However, despite the historically higher areal storage density available for use with magneto-optical disks drives, the prior art magneto-optical disk drive volumetric storage capacity has generally not kept pace with the volumetric storage capacity of magnetic disk drives.

One factor that limits MO disk drives is the magnetic coil that generates the necessary magnetic field for writing data on the MO disk. The magnetic field is applied to a spot of interest on the MO disk from the direction of the incident laser beam, or from the opposite direction. However, the magnetic coils used in these commercial magneto-optical heads are relatively large and heavy device with bulky hand wound coils. These large magnetic coils generally have high inductance and low resonance frequencies leading to background noise problems at higher data transfer rates.

The following patents provide examples of electro-magnetic coil designs for use in MO heads:

U.S. Pat. No. 5,105,408 issued to Lee et al.;
U.S. Pat. No. 5,295,122 issued to Murakami et al.; and
U.S. Pat. No. 5,563,871 issued to Bargerhuff et al.

What is needed is an electro-magnetic coil assembly that is small, with a low mass, and that is capable of generating a vertical magnetic field intensity greater than 200 Oersteds over a large area. The electro-magnetic coil assembly allows high data transfer rates from an optical or a MO data storage system.

SUMMARY OF THE INVENTION

One aspect of the present invention is to provide an electro-magnetic coil assembly for attachment to a slider in an optical or magneto-optical data storage system. The coil assembly has compact, low mass, and high field characteristics, and generates a large magnetic field intensity in the vertical direction, over a large area of the data storage disk (i.e., approximately 200 $\mu$m by 200 $\mu$m).

Another aspect of the coil assembly resides in its relatively inexpensive mass production and assembly cost. The manufacturing process of the coil assembly is compatible with proven wafer processing techniques, and provides highly efficient throughput for mass production.

The coil assembly has a low inductance, thus increasing the resonance frequency of the head and improving its data recording rates. The small size and low mass of the coil assembly further improves the head data access rates.

The coil assembly includes an undercoat, and an electrically conductive coil formed of a length of electrical conductor and deposited and secured to the undercoat by means of available wafer processing techniques. The conductive coil terminates in two bonding pads for providing electrical connection to the coil, such that the coil is capable of sustaining an electrical current in excess of approximately 300 mA. The coil is also capable of generating a significant magnetic field intensity in the vertical direction, and has a resistance of less than approximately 2 ohms.

The coil assembly further includes a yoke, and an insulation layer which encapsulates at least part of the conductor. The conductor is formed of a plurality of multi-layered turns, such that a first layer is connected to one contact pad and is looped helically, inwardly, and terminates in an innermost terminal end. A second layer includes an innermost terminal end that overlays the innermost terminal end of the first layer, in order to establish an electrical contact therewith, and to ensure the continuity of the electrical path formed by the coil. The second layer is coiled into a plurality of concentric helical turns, similar to, and in a same coiling direction as the first layer. The conductor is made of a electrically conductive material and has a substantially uniform square cross-sectional area along its entire length.

The yoke is formed of three sections: a base section, an intermediate section, and a central section, wherein the central section of the yoke fits within a central region of the coil does not include holes. The undercoat may include a detachable tab that facilitates the handling of the coil assembly during manufacture and assembly.

In one embodiment the coil assembly is affixed to a slider on a rotary actuated access mechanism similar to a Winchester disk drive or on a linear actuated access mechanism. The coil assembly generates a vertical magnetic field intensity greater than 200 Oersteds over a relatively large area, for example 200 microns×200 microns. The coil assembly preferably includes a two layered coiled conductor (or coil) housed partly within the yoke, and encapsulated within an overcoat insulation layer. However, in other embodiments the coiled conductor may comprise one or multiple conductor layers. The coil assembly can accommodate a relatively high current (such as approximately 300 mA) to flow therethrough. The dimensions of the coil can vary over a wide range, with the systemic parametric requirements, as needed, while still maintaining a relatively low mass compact structure.

BRIEF DESCRIPTION OF THE DRAWINGS

The features of the present invention and the manner of attaining them, will become apparent, and the invention itself will be understood by reference to the following description and the accompanying drawings, wherein.

Similar numerals refer to similar elements in the drawings. It should be understood that the sizes of the different components in the figures may not be in exact proportion, and are shown for visual clarity and for the purpose of explanation.

DETAILED DESCRIPTION OF THE INVENTION

Figure 1:
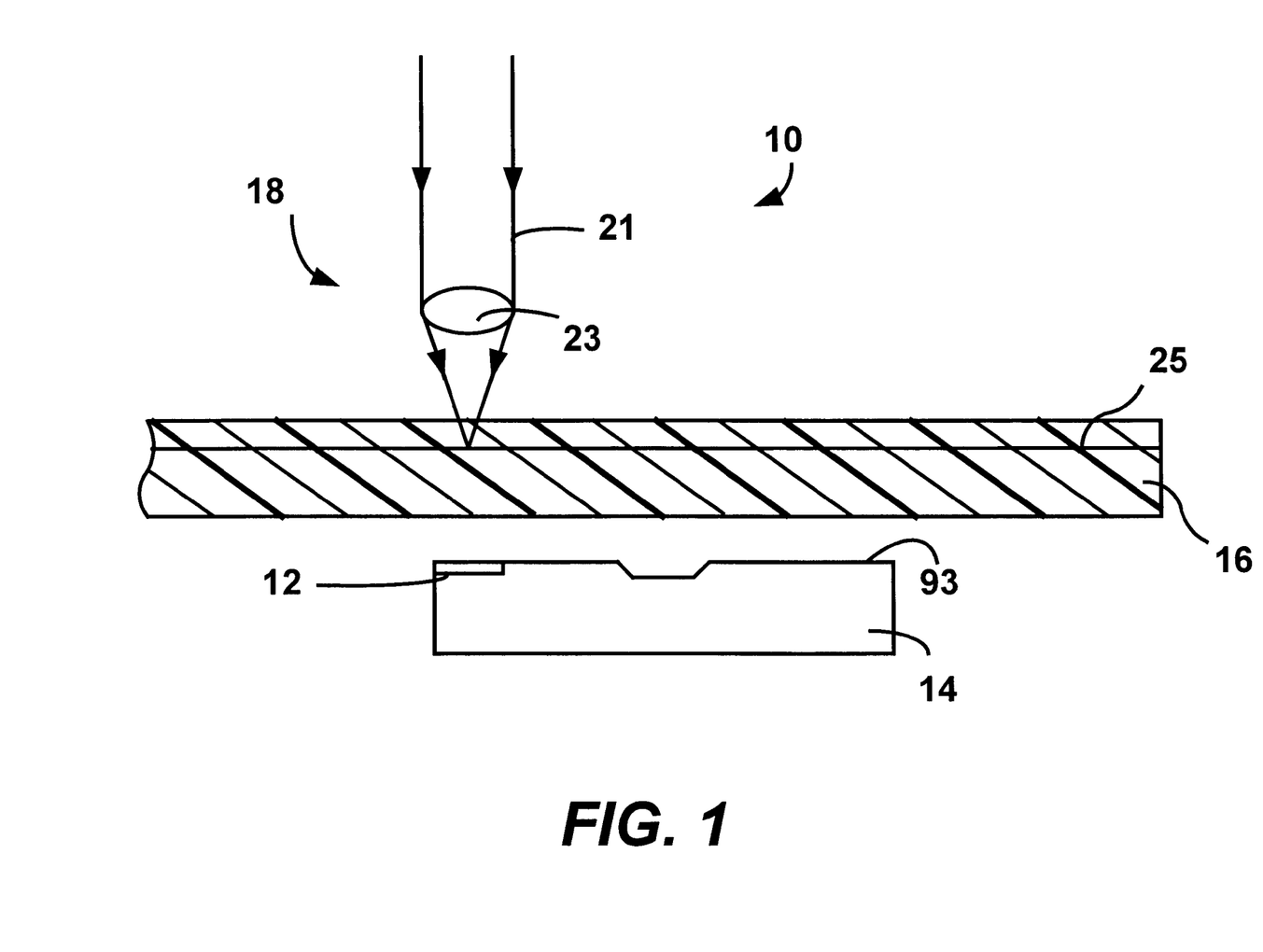
FIG. 1 is a fragmentary, partly sectional, side elevational view of a magneto-optical data storage system showing an electro-magnetic coil assembly of the present invention mounted on a slider and disposed on the opposite side of a disk relative to an optical assembly.

FIG. 1 illustrates a magneto-optical data storage system 10 including an electro-magnetic coil assembly 12 made according to the present invention. The coil assembly 12 is mounted on a slider 14, and disposed at a distance from an optical or magneto-optical (MO) data storage medium or disk 16. An optical assembly 18 is positioned at a distance from the opposite side of the disk 16. As used herein, the term "coil assembly" 12 may be interchangeably used with "transducer".

Figure 7:
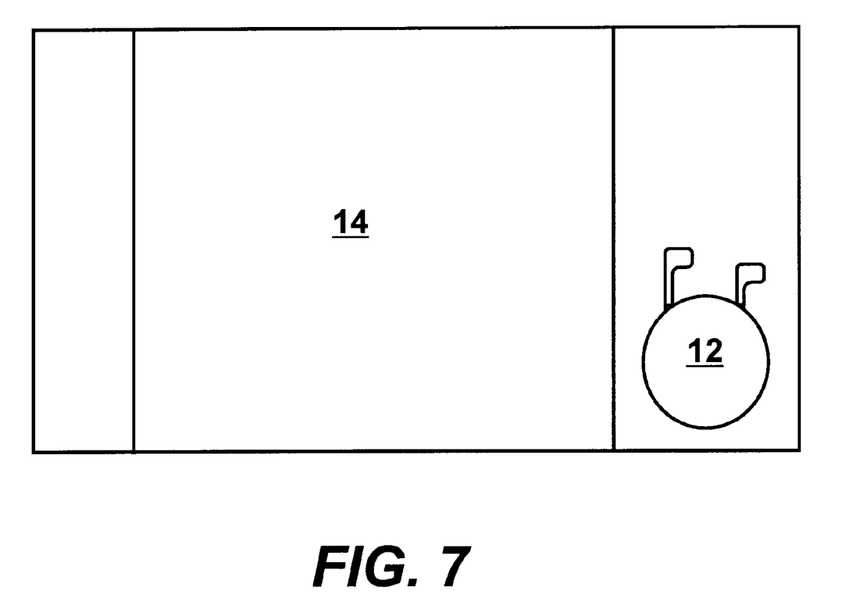
FIG. 7 is a bottom plan view of the coil assembly of FIG. 1, shown mounted on the slider underside.

In the embodiment illustrated in FIGS. 1 and 7, the slider 14 forms part of a head gimbal assembly. The slider 14 is also referred to herein as a support element since it supports the coil assembly 12. The coil assembly 12 is secured to the underside (or air bearing surface) of the slider 14, which is the surface facing the disk 16. While the coil assembly 12 is shown as being secured to an edge of the slider 14 for illustration purpose, it should be clear that the coil assembly 12 can be secured at any suitable position on, or at least partly within the slider 14, as long as the coil assembly 12 generates the required magnetic field.

In operation, a light beam, such as a laser beam 21 impinges upon, and is focused by a lens 23 onto a MO layer 25 of the disk 16. The coil assembly 12 generates a vertical magnetic field with a large magnetic field intensity Hz (FIG. 4) in the vertical direction, for example greater than 200 Oersteds, over a large area of the disk 16, for example 200 microns×200 microns, to enable the transduction of data relative to the MO layer 25.

The details of the coil assembly 12 will now be described with reference to FIGS. 2 through 6. The coil assembly 12 is comprised of an electrically conductive coil 30 formed of a length of electrical conductor 32, and is either deposited or formed on a film or undercoat 34 by means of wafer processing techniques. The undercoat 34 is formed of a dielectric film preferably made of alumina. It should however be clear that other suitable flexible materials (such as a flex circuit or film) or rigid dielectric materials (such as silicon) may alternatively be used. The undercoat 34 is light weight and durable, and enables the coil assembly 12 when it is being assembled onto the slider 14. The thickness of the undercoat 34 is approximately 4 to 12 microns, though other dimensions may optionally be selected. The undercoat 34 may also be referred to as a surface attachment layer, base layer, or substrate.

The coil assembly 12 has compact, low mass, and high field characteristics. The size compactness of the coil assembly 12 allows for a more efficient design especially at higher frequencies since the inductance decreases as the transducer size decreases. This lower inductance raises the resonating frequency of the coil assembly 12, which increases the data recording rate.

The overall mass of the coil assembly 12 may range between approximately 0.03 grams and 0.05 grams. The overall dimensions of the coil assembly 12 may be significantly smaller than the slider underside. In addition, since the coil assembly 12 is mounted directly onto the slider 14, the flying height of the slider 14 is not significantly affected by the presence of the coil assembly 12, thus ensuring a precise control of the flying height of the slider 14 above the disk 16. In addition, the minimal thickness of the coil assembly 12 minimizes the overall z-height (e.g. the vertical height or inter-disk spacing) of a head stack assembly (not shown), thus enabling a disk drive 10 to accommodate an optimal number of disks 14 in a predetermined space. It should be clear that the specific quantities or ranges stated herein are for reference only and that other values may be used depending on the systemic design specifications.

The coil assembly 12 further includes two bonding (or contact) pads 35, 36 for providing means for electrical connection to the coil 30. The bonding pads 35, 36 may be made of electroplated soft gold typically used in ultrasonic wire bonding applications. The coil 30 is further secured to the undercoat 34 by means of three holding pads 41, 42, 43 forming part of a yoke 55, for ensuring a firm connection of the coil 30 to the undercoat 34. It should be clear to a person of ordinary skill in the field that a different number of holding pads may alternatively be used. The bonding pads 35, 36 are formed on the undercoat 34 using known deposition techniques, and are connected to the terminals of the coil 30.

The coil assembly 12 is manufactured on a wafer substrate (not shown) that has been deposited with a continuous base layer of copper using electroplating or evaporation techniques. Other materials may be used, such and NiFe "invar" alloys tailored for thermal expansion matching to the wafer substrate and/or the undercoat 34. This is useful in controlling the internal stress of the resulting coil assembly 12, either to maintain flatness or to induce a degree of desired bending. It should be noted that this continuous copper base layer film is selectively soluble in an etching solution that does not attack the alumina undercoat 34. A continuous film of alumina, which eventually yields the undercoat 34, is deposited on the copper base film. The coil 30 is then formed on the undercoat 34 using standard thin film processing techniques which include: (1) sputter deposition of an adhesive/conductive plating base layer such as Titanium 250/Copper 500; (2) photo resist coating and imaging to form a plating mold; (3) electroplating with copper to form the coil conductor 32; (4) removing the photoresist; and (5) removing the thin plating base layer using ion milling.

Figure 4:
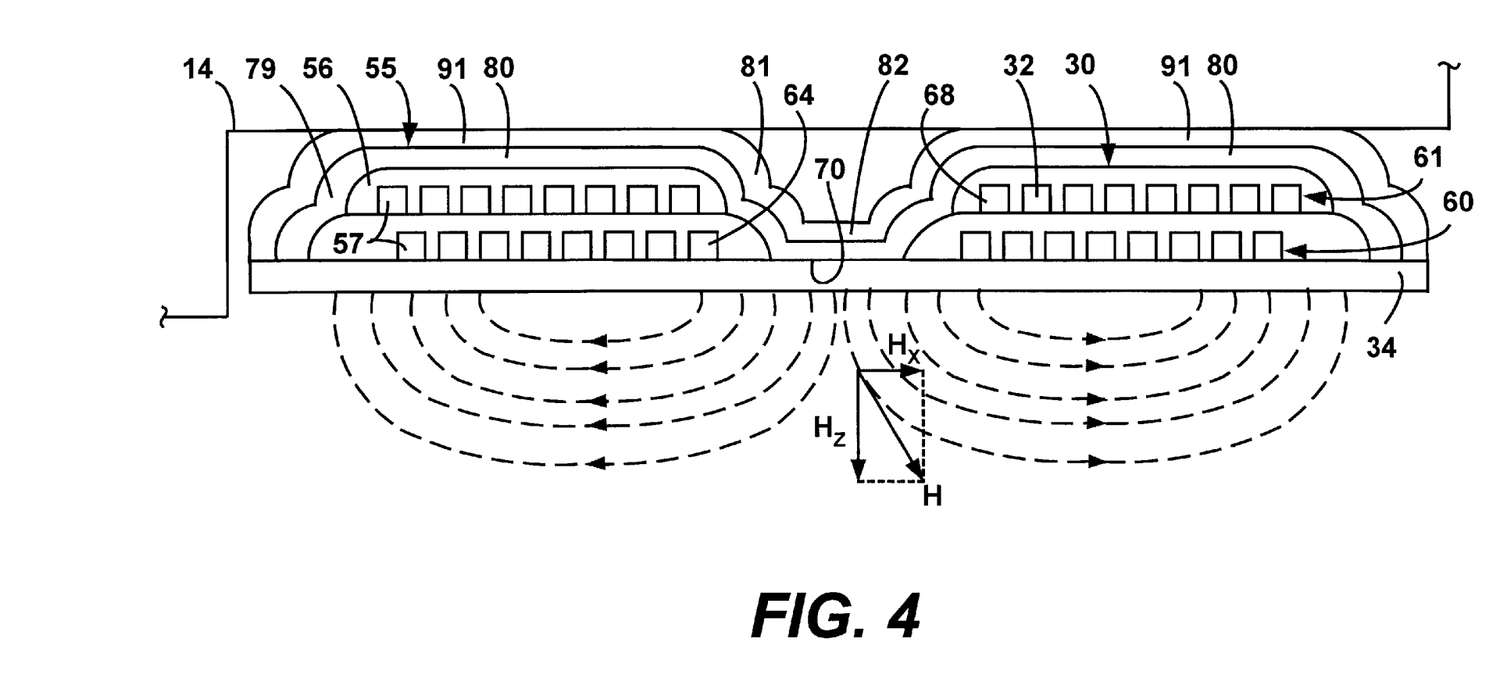
FIG. 4 is a greatly enlarged, cross-sectional, side elevational view of the coil mounted on the slider and taken along line 4—4 of FIG. 3, and further illustrating a magnetic field generated by the coil, the yoke, the insulation layer separating the two coil layers.

The coil 30 is then protected by applying a photoresist insulation layer 56 (FIG. 4). The coil forming process may be repeated at this point to add multiple coil layers if desired. The insulated coil 30 is then patterned and electroplated with NiFe 81:19 permalloy to form the yoke 55 using similar thin film processing techniques as described for the coil 30, except that a NiFe 1000 conductive plating base layer is used. A protective overcaot alumina layer 91 (FIG. 4) is then deposited over the inductor 32 and yoke 55 for protection and selectively removed over the coil terminals so that they may be deposited with gold to provide accessible electrical connection to the coil 30. The coil 30, the yoke 55, and the overcoat 91 are then masked with photoresist to produce an island delineating the final shape of the undercoat 34, and excess alumina is etched away for exposing the copper base layer underneath. The copper base layer is then etched away from around and underneath the islands. When the copper base layer is completely dissolved, the individual islands defining the coil assemblies are released from the copper base layer.

Although the undercoat 34 is illustrated as being substantially flat, it should be clear that other shapes and configurations are possible. The following exemplary dimensions for the coil assembly 12 are included for illustration purpose and are not intended to limit the present invention. The length "L" of the undercoat 34 is approximately 1220 microns. The width "W" of the undercoat 34 is approximately 940 microns.

The design objectives of the exemplary coil 30 described here are to meet or exceed the following requirements, though other design objectives may be set:

Coil current: exceeds approximately 300 mA.

Vertical magnetic field intensity: greater than, or equal to approximately 200 Oersteds.

Coil Self-inductance: less than approximately 170 nH.

Capacitance: less thanapproximately 5 pF.

Resistance: less than approximately 2 Ω.

Figure 2:
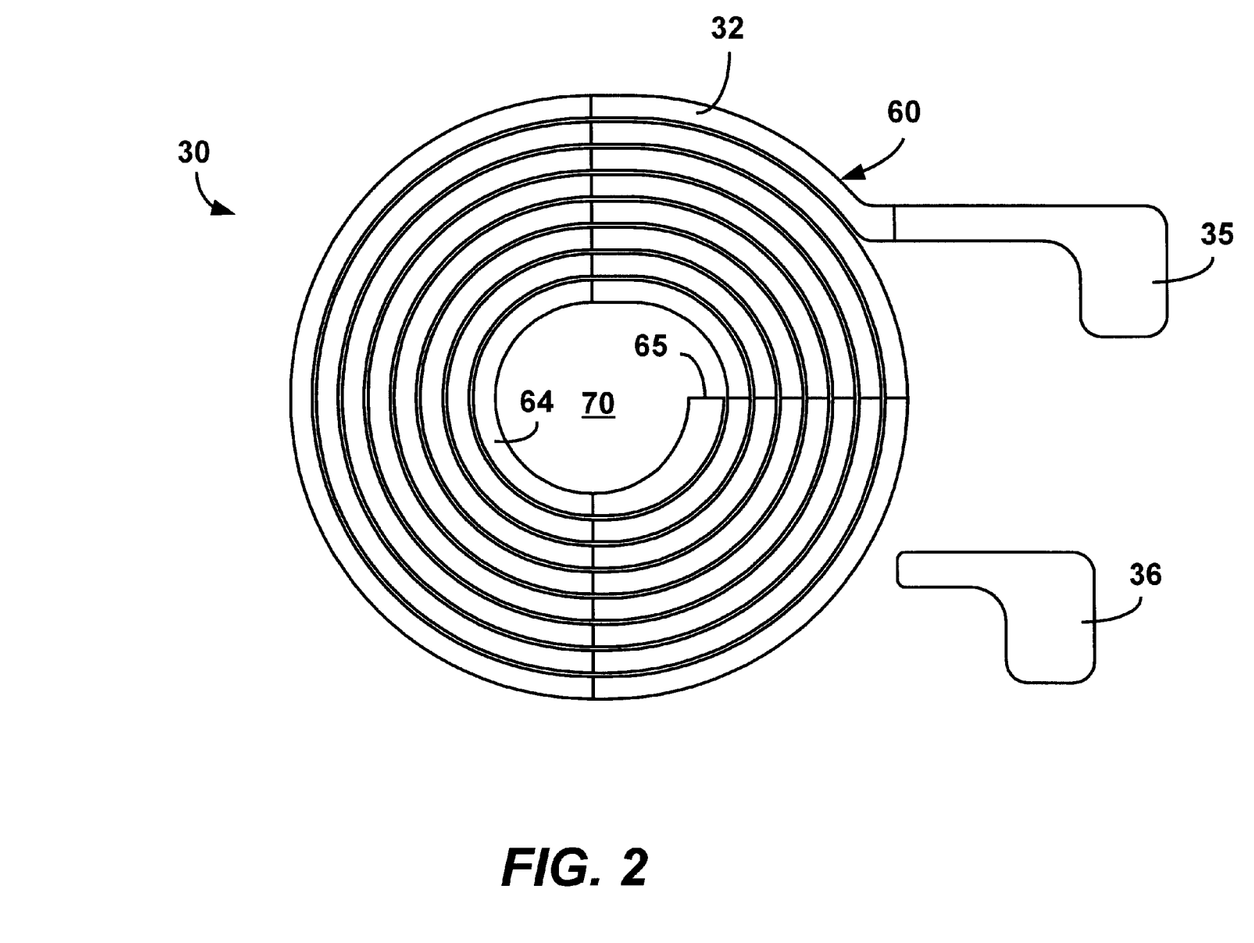
FIG. 2 is an enlarged bottom plan view of a coil used in the coil assembly of FIG. 1, showing only a bottom or first layer and two contact pads.
Figure 3:
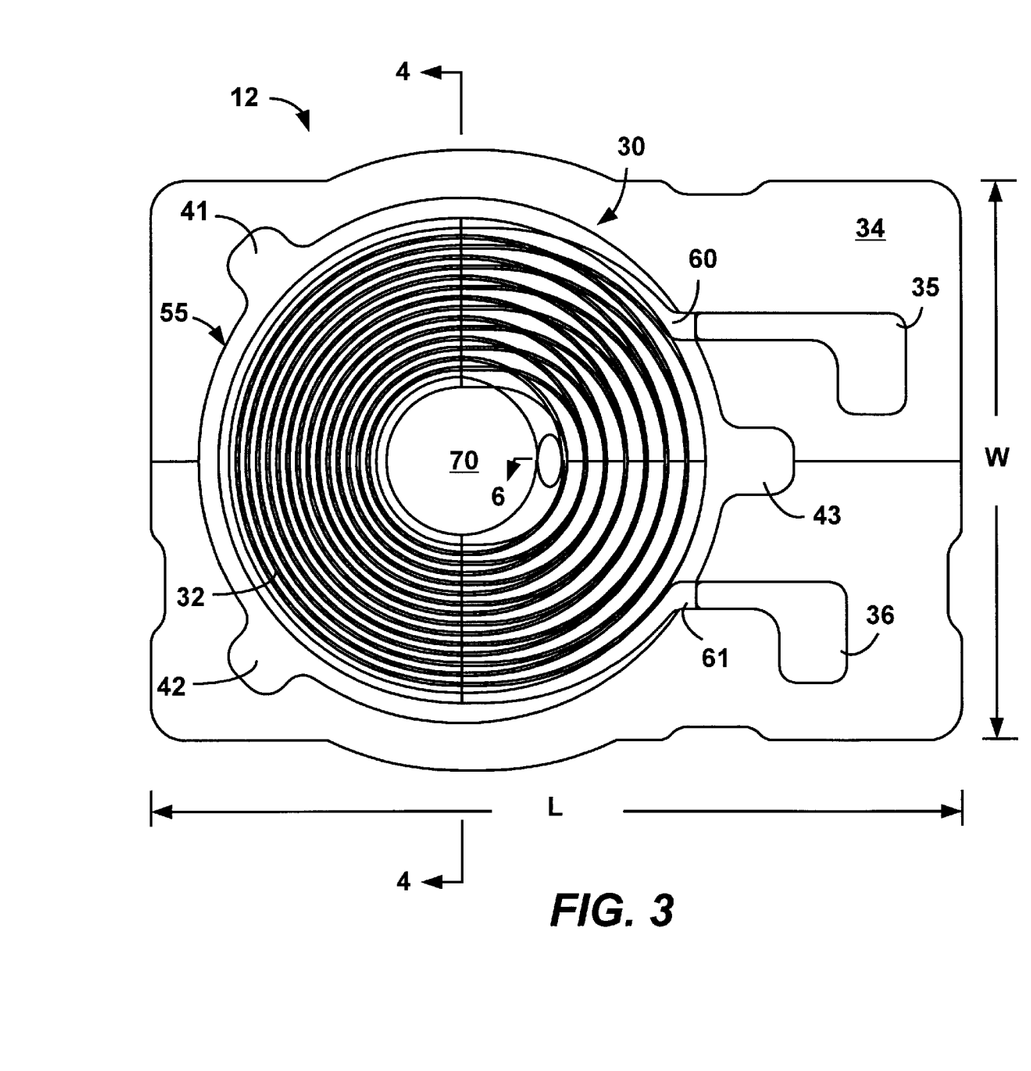
FIG. 3 is an enlarged bottom plan view of the coil assembly of FIG. 1, showing a two-layer coil formed on an undercoat, without an insulation layer separating the two coil layers, and without a yoke.

The conductor 32 is coiled, housed partly within the yoke 55, and encapsulated within the insulation layer 56. The conductor 32 includes a plurality of multi-layered turns 57 (FIGS. 4, 5), with only two layers 60, 61 being shown. The first or bottom layer 60 is connected to the contact pad 35 and is looped helically, inwardly, and terminates in an innermost turn 64 with a terminal end 65 (FIGS. 2 and 6). As is further illustrated in FIG. 6, the second or upper layer (61) starts with a terminal end 67 of an innermost turn 68. The innermost terminal end 67 of the second layer 61 overlays the innermost end 65 of the first layer 60 in order to establish an electrical contact therewith, and to ensure the continuity of the electrical path formed by the coil 30. The second layer 61 is then coiled into a plurality of concentric helical turns 57, similar to, and in the same coiling direction as the first layer 60, and terminates in the contact pad 36. The innermost turn 64 of the first layer 60 defines a central region 70 (FIGS. 2, 3, 4) which is generally circular or helical in shape.

The conductor 32 is made of a suitable electrically conductive material such as copper. While the conductor 32 is illustrated as having a substantially uniform square cross section along its entire length, it should be understood that other appropriate shapes may be selected. The cross-sectional area of each turn 57 varies between approximately 8 microns and approximately 30 microns, and preferably between approximately 8 microns and approximately 16 microns.

The turns 57 are encapsulated within the protective insulation layer 56, and are interspaced and separated by a distance varying between approximately 2 microns and approximately 12 microns, and preferably between approximately 2 microns and approximately 8 microns. The insulation layer 56 is made of a suitable dielectric material, such as photoresist material.

The yoke 55 is made of a suitable ferromagnetic high permeability material such as 81Ni:19Fe nickel iron alloy. A distinctive feature of the coil 30 is that the yoke 55 is formed on top of the insulation layer 56 and the conductor 32, and extends within the central region 70.

Figure 5:
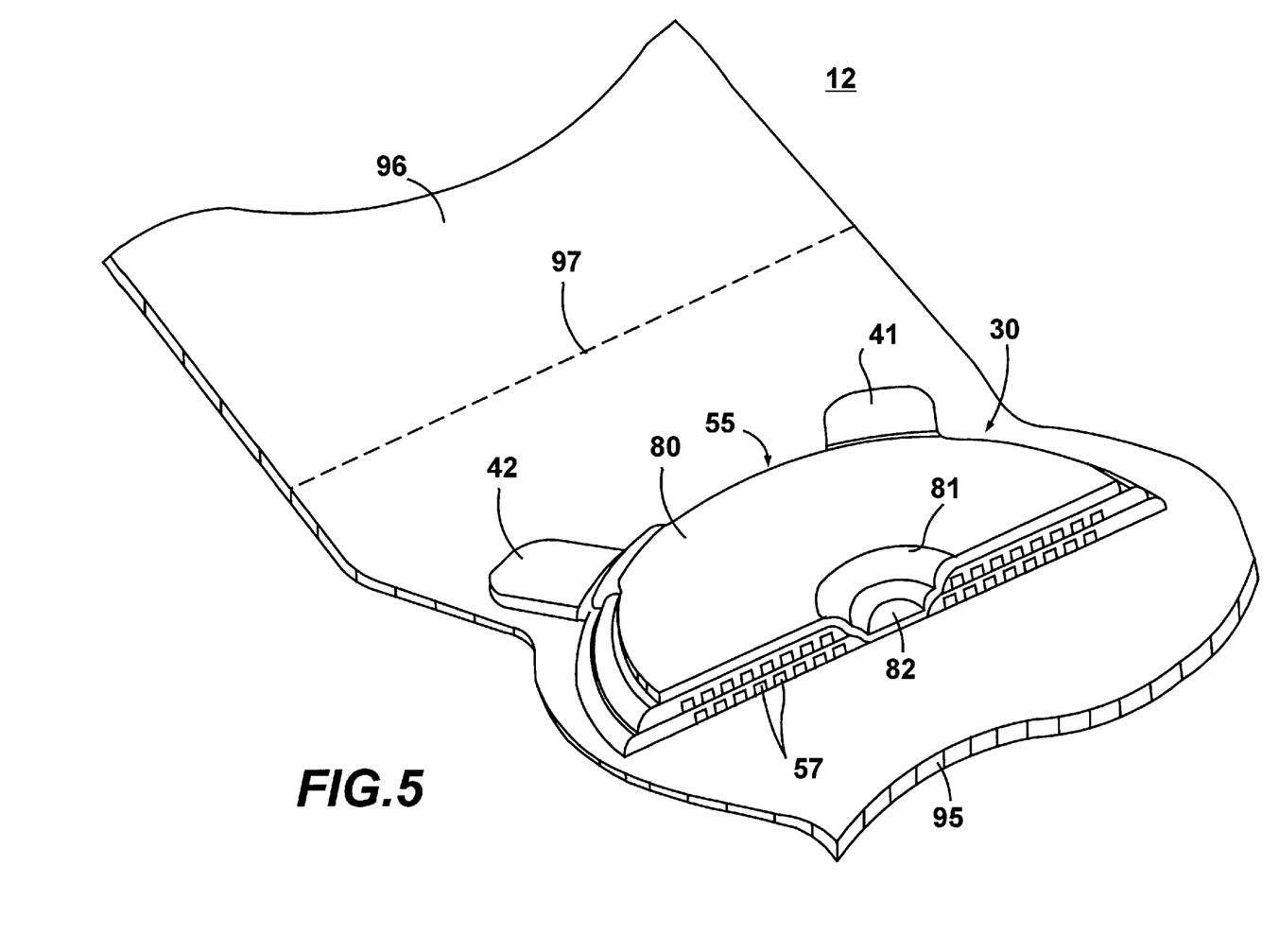
FIG. 5 is a perspective, partly cross-sectional view of the coil of FIGS. 1 through 4 shown without the overcoat layer, and formed on, or bonded to an undercoat (or support member) having a different shape than that of FIG. 3.
Figure 6:
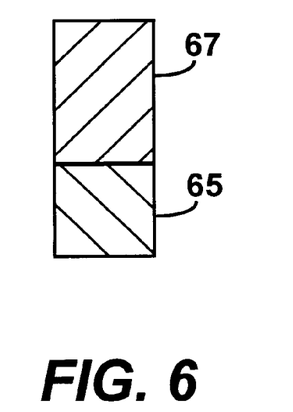
FIG. 6 is a cross-sectional view of a coiled conductor forming part of the coil taken along line 6 of FIG. 3, and showing a terminal end of one conductor layer overlaying a terminal end of another conductor layer.

With reference to FIGS. 4 and 5, the yoke 55 is formed of four sections that are made using available thin film wafer technology: an outer section 79, a base section 80, a sloping (or intermediate) section 81 and a central section 82. The outer section 79 covers the outer periphery of the coil 30. The base section 80 is generally flat and disk shaped, and is formed on the insulation layer 56, on top of the uppermost layer 61 (in this example the second layer). The base section 80 extends integrally or continuously into the sloping section 81 that covers an inner side of the insulation layer 56. In turn, the sloping section 81 extends continuously into the central section 82 that fits within the central region 70 defined by the conductor 32. The central section 82 is substantially flat and, in a preferred embodiment, does not includes any holes. It should however be clear that other design modifications of the yoke 55 are possible without affecting the substance of the present invention. The central section 82 is generally circularly (or elliptically) shaped with a diameter ranging from approximately 90 microns to approximately 150 microns.

The yoke 55 extends closer to the MO layer 25 of the disk 16 (FIG. 1), thus increasing the magnetic field at the MO layer 25. As is shown in FIG. 4, the magnetic field intensity includes a vertical component Hz and a horizontal component Hx. While the horizontal component Hx or the combination of the vertical and horizontal components Hz and Hx may be used in various applications to replace transducers, coils, inductors, or transformers, the present example, i.e., a data storage system illustrated in FIG. 1, mainly uses the vertical component Hz for recording onto vertical domains in the MO layer 25. The vertical components Hz are in the range of 200 Oe to 300 Oe over an area of approximately 200 microns by 200 microns of the MO layer 25.

The thickness of the yoke 55 is preferably uniform and may range between approximately 5 $\mu$m and approximately 10 microns. In another embodiment, the thickness of the yoke 55 is not uniform, and any one or more of the sections 80, 81, 82 forming the yoke 55 may have a different thickness than the remaining section or sections. In the embodiment shown in FIG. 4, the thickness of the central section 82 of the yoke 55 is approximately equal to the height of the first layer 60. It should be clear that the dimensions mentioned herein are simply for purposes of illustration and that other values may be used instead.

With reference to FIG. 4, the coil 30 is at least partly encapsulated within the overcoat layer 91 for added protection and insulation. The overcoat layer 91 is secured or bonded to the slider 16.

The coil 30, and more specifically the yoke 55 and/or the undercoat 34, may be surface mounted or bonded on the underside 93 of the slider 14 by means of available techniques, such as an adhesive. In one embodiment the underside of the coil assembly 12 is coplanar (i.e., flush) with the underside 93 of the slider 14. In another embodiment the underside of the coil assembly is recessed relative to the slider underside 93.

With reference to FIG. 5, the coil assembly 12 includes an undercoat 95 with a different shape than the undercoat 34 to illustrate a possible design modification. In addition, the undercoat 95 (or 34) may include a tab 96 that facilitates the handling of the coil assembly 12 during manufacture and assembly. The tab 96 is preferably detachable and may eventually be broken away along a line 97, when the coil assembly 12 is secured to the slider 14.

It should be understood that the geometry, compositions, and dimensions of the elements described herein may be modified within the scope of the invention. In addition, while the coil assembly 12 has been described in connection with disk drives, it should be clear that the coil assembly 12 may alternatively be used in various other applications, including but not limited to antennas for wireless communications (i.e., cellular telephones), microelectromechanical sensors (MEMS), miniaturized inductors for generation of motion, magnetic storage devices, etc.

What is claimed is:

1. A thin-film coil assembly, comprising:
    an undercoat made of insulating material;
    a thin-film coil including a conductor formed on said undercoat, said coil defining a central region in proximity to said undercoat, and at least part of said conductor being patterned around said central region;
    a yoke including a base section extending integrally in an intermediate section and a central section;
    said yoke base section and said intermediate section overlaying at least part of said coil;
    said yoke central section overlaying at least part of said undercoat within said coil central region and extending within said central region, for providing a path to a magnetic field generated by said coil through said yoke central section; and
    said magnetic field including a vertical magnetic field component that extends through and underneath said undercoat.

2. A coil assembly according to claim 1, wherein said yoke central section is formed directly in contact with said undercoat.

3. A coil assembly according to claim 2, wherein said yoke central section is made of ferromagnetic material.

4. A coil assembly according to claim 2, wherein said yoke central section is substantially flat.

5. A coil assembly according to claim 2, wherein said yoke central section is solid and does not include an opening.

6. A coil assembly according to claim 2, wherein said coil is formed of a plurality of multi-layered turns.

7. A coil assembly according to claim 6, wherein said yoke intermediate section is tapered.

8. A coil assembly according to claim 2, wherein said coil is encapsulated within an insulation layer.

9. A coil assembly according to claim 8, wherein said base section is substantially flat and is formed on said insulation layer.

10. A coil assembly according to claim 2, wherein said yoke further includes an outer section that extends integrally from said base section over an outer surface of said coil, and terminates on, or in close proximity to said undercoat.

11. A coil assembly according to claim 2, wherein said coil is capable of sustaining an electrical current in excess of approximately 300 mA;
    said coil is capable of generating a vertical magnetic field intensity greater than, or equal to approximately 200 Oersteds; and
    said coil having a resistance less than, or equal to approximately 2 ohms.

12. A coil assembly according to claim 2, wherein said undercoat is made of any of: alumina or silicon.

13. A coil assembly according to claim 1, wherein said coil is covered in part by said yoke.

14. A coil assembly according to claim 1, wherein said coil includes a first layer of turns and a second layer of turns;
    wherein said first layer is looped helically, inwardly, and terminates in an innermost turn with a terminal end; and
    wherein said second layer includes an innermost terminal end that overlays said innermost terminal end of said first layer, in order to establish an electrical contact therewith, and to ensure the continuity of the electrical path formed by said coil.

15. A coil assembly according to claim 14, wherein said first layer is connected to a first contact pad; and
    said second layer is connected to a second contact pad.

16. A coil assembly according to claim 15, wherein said second layer is coiled into a plurality of concentric helical turns, similar to, and in a same coiling direction as said first layer.

17. A coil assembly according to claim 2, wherein said coil is made of electrically conductive material and has a substantially uniform square cross-sectional area along its entire length.

18. A coil assembly according to claim 2, wherein said central section is generally circularly shaped with a diameter ranging between approximately 90 microns and approximately 150 microns.

19. A coil assembly according to claim 2, wherein said undercoat includes a tab that facilitates the handling of the coil assembly during manufacture and assembly.

20. A coil assembly for use in an optical or a magneto-optical data storage system including a slider that defines an air bearing surface, the coil assembly comprising:
    an undercoat made of insulating material;
    a thin-film coil including a conductor, and secured to said undercoat, said coil defining a central region in proximity to said undercoat; and at least part of said conductor being patterned around said central region;
    a yoke for attachment to the slider, including a base section extending integrally in an intermediate section and a central section;
    said yoke base section and said intermediate section overlaying at least part of said coil;
    said yoke central section being formed on, and overlaying at least part of said undercoat within said coil central region and extending within said central region, for providing a path to a magnetic field generated by said coil through said yoke central section;
    said yoke central section being generally parallel to the slider air bearing surface; and
    said magnetic field including a vertical magnetic field component which extends through and underneath said undercoat.

21. A coil assembly according to claim 1, wherein the intensity of said vertical magnetic field component is sufficiently large to enable writing of data on a storage medium disposed at a distance underneath said undercoat.

22. A coil assembly according to claim 21, wherein the intensity of said vertical magnetic field component is greater than, or equal to approximately 200 Oersteds.

23. A coil assembly according to claim 22, wherein the intensity of said vertical magnetic field component is greater than, or equal to approximately 200 Oersteds at said distance, over an area of said storage medium.

24. A coil assembly according to claim 23, said area of said storage medium is approximately 40000 microns square.

25. A coil assembly according to claim 1, said yoke central section is substantially parallel to an air bearing surface of a support element, to enhance said vertical magnetic field component on a medium disposed underneath said undercoat.

26. A coil assembly according to claim 20, wherein the intensity of said vertical magnetic field component is sufficiently large to enable writing of data on a storage medium disposed at a distance underneath said undercoat.

27. A coil assembly according to claim 26, wherein the intensity of said vertical magnetic field component is greater than, or equal to approximately 200 Oersteds.

28. A coil assembly according to claim 27, wherein the intensity of said vertical magnetic field component is greater than, or equal to approximately 200 Oersteds at said distance, over an area of said storage medium.

29. A coil assembly according to claim 28, said area of said storage medium is approximately 40000 microns square.

30. A coil assembly according to claim 20, said yoke central section is substantially parallel to an air bearing surface of a support element, to enhance said vertical magnetic field component on a medium disposed underneath said undercoat.

31. A coil assembly according to claim 1, wherein said yoke is a single continuous pole.

32. A coil assembly according to claim 2, wherein said yoke provides an open path to said magnetic field.

33. A coil assembly according to claim 20, wherein said yoke is a single continuous pole.

34. A coil assembly according to claim 24, wherein said yoke provides an open path to said magnetic field.

* * * * *